United States Patent [19]

Stautzenberger et al.

[11] Patent Number: 4,959,449

[45] Date of Patent: Sep. 25, 1990

[54] PROCESS FOR PREPARING LOW COLOR POLYARYLATES

[75] Inventors: Adin L. Stautzenberger; Edward E. Quick, both of Corpus Christi, Tex.; Peter F. Lobo, North Plainfield, N.J.

[73] Assignee: Hoechst Celanese Corporation, Somerville, N.J.

[21] Appl. No.: 356,692

[22] Filed: May 25, 1989

[51] Int. Cl.$^5$ .................... C08G 63/00; C08G 63/02
[52] U.S. Cl. .................... 528/271; 524/599; 524/845; 528/179; 528/180; 528/181; 528/272
[58] Field of Search .............. 528/179, 180, 181, 271, 528/272; 524/599, 845

[56] References Cited

U.S. PATENT DOCUMENTS 4,499,226  2/1985  Massey et al. ............... 524/382
4,835,243  5/1989  Eckhardt et al. ............. 528/181

Primary Examiner—Harold D. Anderson
Assistant Examiner—T. Mosley
Attorney, Agent, or Firm—Depaoli & O'Brien

[57] ABSTRACT

Polyarylates formed by reacting the diester of a dihydric phenol such as bisphenol-A and at least one aromatic dicarboxylic acid in the presence of an esterification catalyst is provided with improved color by the addition of cobalt during polymerization. The amount of cobalt can be reduced and an additional amount of an ultramarine blue pigment can be added to the reaction mixture to maintain the color improvement.

40 Claims, No Drawings

PROCESS FOR PREPARING LOW COLOR POLYARYLATES

BACKGROUND OF THE INVENTION

This invention is directed to polyarylates of improved color.

Polyarylates are polyesters derived from a dihydric phenol, particularly 2,2-bis(4-hydroxyphenyl)propane, also identified as bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Many processes have been described in the literature for the preparation of polyarylates. One such process is the diacetate process. In the diacetate process, a dihydric phenol is converted to its diacetate, which is then reacted with an aromatic dicarboxylic acid(s) to form the polyarylate.

However, the polyarylates produced by the diacetate process have a tendency to be colored which could make them unsuitable in some end use applications. Thus, there is a desire to improve the color of the polyarylate for such end use applications.

One known measure of polymer color which can be used as an objective standard of evaluation is the Hunter scale represented by the L, a, and b axes. L is a black-white scale representing the transmission of light through a sample, a is a red-green scale and b is a yellow-blue scale. It is preferred to obtain as close to a neutral color as possible represented by an a, b point of 0,0 on the Hunter scale. Additionally, the light transmission of the polyarylate must be considered and not adversely affected.

An attempt has been made to improve the color of melt-prepared polyarylates formed by the catalytic melt transesterification of diphenyl terephthalate and/or diphenyl isophthalate with bisphenol A. Thus, commonly assigned, copending application, U.S. Ser. No. 068,163, filed June 30, 1987, discloses including a cobalt-containing salt in the molten polymerization mixture of the above monomeric components and polymerizing in the presence of an alkali metal transesterification catalyst to yield a polyarylate which has a bluish tint which is more commercially desirable. The cobalt salts and compounds disclosed as useful in this copending application include cobalt carbonate, cobalt benzoate, cobalt phenate and cobalt acetate. The process, however, as disclosed in this prior application is not directed to forming polyarylates by the diacetate process and, thus, no predication could be made from such application as to whether the same color improvement could be achieved in polyarylates formed by the diacetate process.

SUMMARY OF THE INVENTION

The present invention is directed to an improved polymerization process for preparing low color, high molecular weight aromatic polyesters. The process comprises reacting a diester of a dihydric phenol, or an acid anhydride and a dihydric phenol, with an aromatic dicarboxylic acid, or a mixture of aromatic dicarboxylic acids, in the presence of a polyesterification catalyst and sufficient amounts of a cobalt salt to yield polyarylates of greatly reduced color, in particular, reduced yellow color. It has also been found that the cobalt compound enhances catalytic activity.

It has further been found that by adding cobalt to the reaction mixture at levels below that which substantially improves polyarylate color and further adding an ultramarine blue pigment to the reaction mixture, improved polyarylate color can still be achieved. It is believed that there may be an advantage in reducing the ultimate cobalt content of the polyarylate, since cobalt may catalyze the oxidation of the polyarylate. Thus, it is suspected that reduced levels of cobalt may lead to a polyarylate of improved weatherability.

DESCRIPTION OF THE INVENTION

The present invention is directed, in general, to an improved process for the preparation of normally solid amorphous polyarylates having an intrinsic viscosity of from about 0.45 to greater than 1.0 dl/gm, which process comprises reacting a diester derivative of a dihydric phenol with an aromatic dicarboxylic acid or a mixture of aromatic dicarboxylic acids in the presence of a polyesterification catalyst and sufficient amounts of a cobalt salt to yield a polyarylate of improved color and/or to enhance the reaction rate. It has also been found useful with respect to catalysis and color improvement to add from about 10 to about 60 weight percent, based on the weight of reactor charge, of an inert solvent. Polymerization proceeds at temperatures of from about 200° to about 350° C.

The present process comprises reacting:

(a) at least one diester derivative of a dihydric phenol having the following formula:

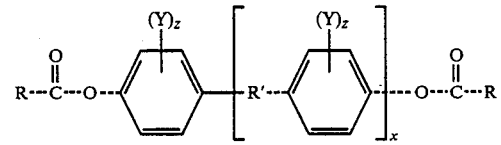

wherein R is independently selected from hydrogen, an alkyl radical having from 1 to about 6 carbon atoms, preferably methyl, cycloalkyl having from 4 to about 7 carbon atoms, or aryl, Y is independently selected from alkyl groups of 1 to 4 carbon atoms, chlorine or bromine, z independently has a value of from 0 to 4, inclusive, and R' is independently selected from a divalent saturated aliphatic hydrocarbon radical, particularly alkylene or alkylidene radicals having from 1 to 8 carbon atoms or halogenated derivatives thereof, especially $C(CH_3)_2$, $C(CX_3)_2$; wherein X is a halogen, preferably fluorine, cycloalkylene or cycloalkylidene radicals having up to and including 9 carbon atoms, halogenated derivatives thereof, O, S, SO, $SO_2$, and CO, x is 0 or 1; and (b) at least one aromatic dicarboxylic acid.

The diester derivative of the dihydric phenol is prepared by reacting a dihydric phenol with an acid anhydride derived from acids containing from 1 to 8 carbon atoms under conventional esterification conditions. The preferred acid anhydride is acetic anhydride. Although the diester derivative of the dihydric phenol can be formed prior to reaction with the aromatic dicarboxylic acid, it is preferred to perform the reaction in one vessel in which the aromatic dicarboxylic acid, dihydric phenol and acid anhydride are added simultaneously. Thus, the reaction can be represented below using as reactants terephthalic acid, bisphenol-A and acetic anhydride.

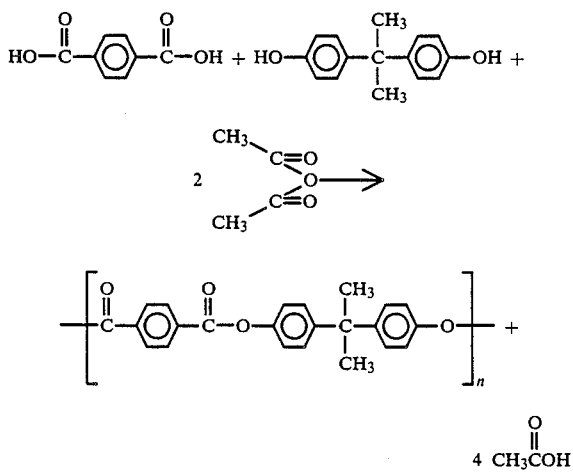

The dihydric phenols that may be used in this invention include but are not limited to the following:
2,2-bis-(4-hydroxyphenyl)propane,
2,2-bis-(4-hydroxyphenyl)hexafluoropropane
bis-(2-hydroxyphenyl)methane,
bis-(4-hydroxyohenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyohenyl)-1,2-bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxvbenzophenone),
hydroquinone, and
naphthalene diols.

These dihydric phenols may be used individually or in any combination. It is also possible to add up to 50 wt. % based on the total diol content of aliphatic diols, such as neopentyl glycol. The preferred dihydric phenol is 2,2-bis(4-hydroxyphenyl)propane (bisphenol-A).

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixtures of isophthalic and terephthalic acids are used such as in a ratio ranging from 85:15 to 15:85. More preferably, the isophthalic acid to terephthalic acid ratio in the mixture is about 80:20 to 50:50. An especially preferred mixture comprises 75:25 isophthalic acid to terephthalic acid. Also, from about 0.5 to about 20 percent of aliphatic diacids containing from 2 to about 10 carbon atoms, such as adipic acid, sebacic acid, and the like may be additionally used in the polymerization reaction.

Moreover, use of small quantities of polyhydric phenols (3 or more OH groups) to produce long-chain branching and, otherwise, modify polymer properties may also be practiced. Similarly, small amounts of polycarboxylic acids may be used.

The reaction of the diester derivative of a dihydric phenol with the aromatic dicarboxylic acid is preferably carried out in a solvent which is present in amounts of from about 10 to about 60, preferably from about 10 to about 40, and most preferably, from about 10 to about 30 weight percent, based on the weight of the total charge. A preferred solvent comprises a diphenyl ether (also known as diphenyl oxide) compound. The diphenyl ether compound may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interfere with the polyarylate forming reaction or the reaction forming the diester derivative of the dihydric phenol. A preferred solvent comprises a eutectic mixture of diphenyl oxide and biphenyl, which solvent is a liquid at room temperature.

The amount of the diphenyl ether compound could vary during the polymerization reaction. For example, it may be advantageous to increase progressively the amount of diphenyl ether compound to maintain the reaction medium at about constant viscosity. The presence of a solvent at the end of polymerization is also useful since the formed polymer may be suitably endcapped in solution and subsequently recovered by any known non-reactive devolatilization process.

The reaction of the diester derivative of the dihydric phenol with the aromatic dicarboxylic acid is performed with the diester and acid reactants present in a diester/acid ratio of from about 0.85–1.10 and, preferably, from about 0.97–1.03 to provide an intrinsic viscosity of at least 0.5 dl/g.

The process of this invention is carried out at a polymerization temperature of from about 200° to about 350° C. and preferably, from about 275° to about 305° C. The present process is generally conducted in an inert atmosphere (such as argon or nitrogen). It is desirable to maintain the reaction temperature as low as possible to prevent the coloration of polymer while as high a reaction temperature as possible is preferred in terms of the rate of reaction. The process is initially carried out at atmospheric pressure or super atmospheric pressure and the pressure is reduced as polymerization proceeds. Near the end of polymerization, pressure as low as 0.5 torr absolute may be used.

Catalysts are used to accelerate the rate of polymerization. All the conventional catalysts being capable of accelerating an ester exchange reaction are usable. Suitable examples of catalysts are salts or compounds of elements selected from Groups 1A, 2A, 2B, 3A, 4A and 5A of the periodic table of elements. Examples include metal oxides (e.g., magnesium oxide, lead oxide, zinc oxide, antimony trioxide); alkoxides which are prepared by the reaction of an alcohol or glycol and an alkali metal, alkaline earth metal, aluminum or titanium; sodium acetate and sodium benzoate; metal hydrides and metal borohydrides (e.g., lithium hydride, potassium borohydride ($K_2B_2H_2$)). The preferred catalyst is an alkali metal salt and most preferred are lithium and potassium salts including the acetates, carbonates, benzoates, formates, bicarbonates, hydroxides, phosphates and monohydrogen phosphates of lithium or potassium. The lithium salts are especially preferred including lithium acetate, carbonate and hydroxide. The catalyst is added in amounts between about 5–100 ppm based on polymer, preferably about 20–50 ppm, and most preferably about 25 ppm.

An adjunct catalyst may also be used. Examples include the imidazole catalysts disclosed in U.S. Pat. No. 4,612,360 herein incorporated by reference. Specific examples include 1-methylimidazole, 1-ethylimidazole, 2-ethyl-4-methylimidazole, and benzimidazole.

In accordance with the present invention, a cobalt salt is added to the reaction medium along with the esterification catalyst, to act as cocatalyst and as well to yield a polyarylate of improved color, in particular, improved Hunter b color in which the yellowness of the polyarylate is substantially reduced. It has been unexpectedly found that cobalt has a greater catalytic effect in the "diacetate process" than in the melt transesterification of diesters of aromatic dicarboxylic acids and bisphenols to polyarylates as described in aforementioned U.S. Ser. No. 068,163. The addition of cobalt to the reaction medium has also been found to reduce the yellow color in the "as-prepared" polyarylates formed by the present diacetate process. Any cobalt salt may be used as the cocatalyst to improve polyarylate color including but not limited to cobalt acetate, cobalt benzoate, cobalt carbonate, cobalt phenate, and cobalts salts comprising the cobalt esters of aliphatic or isoaliphatic acids which contain 3 to 20 carbon atoms, such as cobalt 2-ethylhexanoate. The cobalt salt can be added directly to the monomeric components or, more preferably, to insure solubility and uniform dispersion of the cobalt salt, the cobalt salt can be dissolved in a solvent prior to addition. Any conventional solvent may be used. In general, the cobalt salt should be added in sufficient amounts to yield at least about 20 ppm, preferably at least 25 ppm of cobalt in the final polymer. Below these levels, some color improvement has been found although water white color is not achieved. More preferably, the amount of cobalt should range from about 30 ppm to 60 ppm based on the final polymer. Preferred polyarylate color has a value of less than 2.0 on the Hunter b scale.

For certain uses, it may be undesirable to have a high level of cobalt contained within the polyarylate. For example, the light transmission of the polyarylate may be adversely affected by high levels of cobalt. It is also believed that the cobalt may catalyze the air oxidation of the polyarylate, thus, decreasing the weatherability of the polyarylate and reducing the ability of the polyarylate to be used in outdoor environments. Fortunately, it has been discovered that if the cobalt addition previously described is reduced to the extent that there is insufficient cobalt to achieve the preferred Hunter b color of the as prepared polyarylate, i.e., less than about 25 ppm, substantial color improvement can still be obtained by supplementing the low level of cobalt with an ultramarine blue pigment. Ultramarine blues are complex sodium aluminum sulfosilicates. The composition of ultramarine blue pigments varies within these ranges: $Na_2O$, 19–23 wt. %; $Al_2O_3$, 23–29 wt. %; $SiO_2$, 37–50 wt. %; and S, 8–14 wt. %. Ultramarine blue pigments do not contain any heavy or multivalent metals which would behave as an oxidation catalyst. Broadly, the ultramarine blue can be added in amounts of 20 to 100 ppm based on polymer. The ultramarine blue has not been found to have any catalytic effect but, appears to enhance the reduction of the yellow color in the polyarylate when mixed with the cobalt. Further, by itself, without cobalt addition, the ultramarine blue pigment has not been found to adequately reduce the yellow color of the as-prepared polyarylate.

The polymerization reaction is conducted for a period of time sufficient to produce a polyarylate having an intrinsic viscosity of at least about 0.45 to greater than 1.0 dl/gm, which time is generally in the range of from about 4 hours to about 8 hours, depending on the particular polyarylate being prepared.

The polymerization reaction of this invention may be carried out batchwise or continuously by using appropriate staging and by using suitable apparatus. Moreover, the reactants may be added to the polymerization zone in any way or order desired.

The diester derivative of the dihydric phenol may be formed in situ by adding the dihydric phenol together with the acid anhydride, an aromatic dicarboxylic acid and, optionally a solvent such as diphenyl ether compound to the reactor and the reaction carried out in a single reaction zone under combined esterification and polymerization conditions as described above. Additionally, the diester derivative of the dihydric phenol may be first prepared and then an aromatic dicarboxylic acid and a diphenyl ether compound added directly to the same reaction vessel with the polymerization being carried out under the conditions described above.

The polyarylate polymer having an intrinsic viscosity of at least about 0.45 dl/g is recovered in its final form by methods well known to those in the art, such as by direct devolatilization in an extruder under conditions sufficient to remove the diphenyl ether compound, coagulation, spray drying, and the like.

The polyarylates may also be prepared by first forming a polyarylate prepolymer having an intrinsic viscosity of from about 0.1 to about 0.4 dl/gm, by reacting the diester derivative of a dihydric phenol with an aromatic dicarboxylic acid under the conditions described previously, for a reaction time of about 3 hours. Under batch conditions, the polyarylate prepolymer is then heated at temperatures of from about 275–305° C. to obtain a polyarylate having an intrinsic viscosity of from about 0.45 to greater than 1.0 dl/gm.

Alternatively, the polyarylate prepolymer may be added directly, after its formation, to a vented extruder wherein the molecular weight is increased to form a polymer having an intrinsic viscosity of from about 0.45 to greater than about 1.0 dl/gm. For example, the molecular weight of a polyarylate prepolymer is increased in the extruder at a temperature of from about 320 to about 360° C, under pressure of about 0.3 to about 2 torr and a residence time of from about 5 to about 30 minutes.

The process of this invention produces normally solid polyarylates having an intrinsic viscosity of from about 0.45 to greater than about 1.0, preferably from about 0.55 to 0.70 dl/gm, as measured in 1,1,2,2-tetrachloroethane at 30° C. It has been found that as the intrinsic viscosity increases beyond the preferred levels, the color of the polyarylate becomes less acceptable.

The polyarylates may be prepared in the presence of materials such as molecular weight regulators, antioxidants, and the like. The polyarylates obtained by the process of this invention may be used together with the well-known additives such as plasticizers, pigments, lubricating agents, mold release agents, stabilizers, inorganic fillers, and the like. These polyarylates may also be blended with other polymers.

The following examples are for the purpose of illustrating the invention and should not be construed so as to unduly restrict the invention to the specific embodiments shown.

EXAMPLE 1

A polyarylate was formed by reacting the following materials:

|  | wt. % of charge |
|---|---|
| 29.07 g bisphenol-A (BPA) | 28.05 |
| 15.87 g isophthalic acid (IPA) | 15.31 |
| 5.29 g terephthalic acid (TPA) | 5.10 |
| 26.54 g acetic anhydride (Ac$_2$O) | 25.61 |
| 26.87 g Dowtherm A[1] | 25.93 |
| 0.0071 g LiOH.H$_2$O | |
| 0.24 ml of 3.5% cobalt 2-ethylhexanoate in toluene | |

[1] A mixture of diphenyl oxide and biphenyl, from Dow Chemical Co.

The bisphenol-A, isophthalic acid, terephthalic acid, and acetic anhydride were present in a mole ratio of 1:0.75:0.25:2.04, respectively. The lithium concentration as Li was 25 ppm and the cobalt concentration as Co was 35 ppm, each in relation to the ultimate polymer (calculated from amount charged).

The dry solids were charged to a 200 ml glass reactor under N$_2$ and dried at 100° C and approximately 0.08 torr absolute pressure for over one hour.

The remaining material was charged and the mixture heated at a rate of 1.5-2° C./min to 290-300° C. with stirring at approximately 175 rpm. Acetic acid started distilling before the temperature reached about 175° C. and about half the theoretical acetic acid ($\frac{1}{2} \times 15.3$ g) was distilled off before 190° C., the result of bisphenol-A acetylation. The pressure was reduced over a period of 30-40 min. to 0.70 torr. The stirrer speed began at approximately 175 rpm and was reduced during the run to minimize polymer creep up the stirrer shaft to about 2 rpm. Dowtherm A (bp approximately 255° C., 1 atm) stripped off during the run with the rest of the acetic acid of reaction and was absent in the reactor by the end of the run. After 2 hours at 300° C and low pressure, vacuum was broken and the viscous polymer was carefully removed.

A 1/16 in. thick plaque of polymer was made between two hot platens in a Carver press and Hunter Lab color values were obtained. Intrinsic viscosity was measured at 25° C. for 0.5 w/v % solution in 1,1,2,2-tetrachloroethane.

The clear plaque had intrinsic viscosity and Hunter Lab color[2] properties of those shown in Table 1. The colorimeter used was Hunter Associates Laboratory (Reston, Virginia 22090) tristimulus D25 P optical sensor with a HL D-25-PC2 processor. Hunter b of 1.6 is near "water white". YI is a yellowness index.

TABLE 1

| Intrinsic viscosity and Hunter Color of Polyarylate | | | | |
|---|---|---|---|---|
| I.V., dl/g | b | L | a | YI |
| 0.608 | 1.6 | 91.4 | −0.3 | 2.8 |

EXAMPLE 2

Polyarylates were formed by the procedure of Example 1. The amounts of the bisphenol-A and acid reactants were the same as Example 1 for all samples. Variations on the use of a 1-methylimidazole cocatalyst, the use and amounts of LiOH catalyst, cobalt and solvent were used to measure the effects of these materials on the intrinsic viscosity and Hunter color of the formed polyarylates. The amounts of each variable and I.V. and color of the formed polyarylates are shown in Table 2.

TABLE 2

| Sample No. | Li ppm # | Cocatalyst | ppm ## | Solvent % | Cobalt ppm # | I.V. dl/g | b | L |
|---|---|---|---|---|---|---|---|---|
| 1 | 25 | me.imid | 2500 | 26 | — | 0.412 | 5.8 | 91.6 |
| 2 | 25 | " | " | " | 18 | 0.65 | 8.0 | 90.9 |
| 3 | 25 | " | 1000 | " | 18 | 0.712 | 6.5 | 91.7 |
| 4 | — | " | " | " | 18 | 0.532 | 10.5 | 92.8 |
| 5 | 25 | — | — | " | 35 | 0.571 | 1.6 | 90.7 |
| 6 | — | — | — | " | 40 | 0.544 | 9.0 | 91.7 |
| 7 | — | — | — | — | 40 | 0.398 | 9.2 | 91.7 |
| 8 | 25 | — | — | 26 | 30 | 0.587 | 4.7 | 93.3 |
| 9 | 25 | — | — | — | 40 | 0.31 | 10.0 | 93.0 |
| 10 | — | — | — | 26 | — | 0.437 | 5.2 | 93.1 |

On polymer (calculated)
On original charge

As can be seen from Table 2, the addition of the cobalt appears to increase catalytic activity as measured by the increase in the intrinsic viscosity in those samples where cobalt is added. As far as color reduction can be determined, the addition of the imidazole cocatalyst appeared to hinder color improvement. The results of Table 1 were duplicated by Sample 5 in which the 1-methylimidazole catalyst was not present and the cobalt content was above 25 ppm. As seen from Sample 6, cobalt alone while providing a sufficient intrinsic viscosity, did not result in a vast improvement in polyarylate color. It can also be seen from Table 2 that the absence of solvent has an adverse effect on intrinsic viscosity (Sample 7) as well as color (Sample 9). A comparison of Samples 5 and 8 with Samples 6 and 10 illustrates the need of both a catalyst and cobalt cocatalyst to yield significant improvements in polyarylate color.

EXAMPLE 3

The procedure of Example 1 was again utilized to form polyarylates. In this example, different cobalt salts were added in an amount of 40 ppm cobalt based on polymer formed. The results with respect to intrinsic viscosity and Hunter color are set forth in Table 3.

TABLE 3

| Sample No. | Cobalt Cocatalyst | I.V. | L | b |
|---|---|---|---|---|
| 1 | Cobalt Benzoate | 0.470 | 92.2 | 1.7 |
| 2 | Cobalt Aluminate | 0.577 | 92.5 | 3.7 |

As can be seen, cobalt benzoate and cobalt aluminate resulted in improved polyarylate color comparable to that shown in Example 1 utilizing the cobalt 2-ethylhexanoate.

EXAMPLE 4

Another example of a batch glass reactor run as in Example 1 was conducted. It was run the same as Example 1 except without solvent and with cobalt acetate instead of cobalt 2-ethylhexanoate. Product quality was I.V. = 0.51 dl/g, Hunter L 32 88.2, and Hunter b = 3.5. I.V. was relatively low suggesting solvent dependence of this variable as shown in Example 2. Color was good indicating cobalt acetate is useful as a color improver. Comparison can be made with no-solvent Sample 9 from Table 2.

EXAMPLE 5

A modification of the process used in Examples 1–4 consisted of charging the reaction mixture to a 1-liter distillation vessel fitted with a glass or 316 stainless steel stirrer, and a 12-tray, 1-inch diameter, Oldershaw distillation column and reflux head.

This system offers an advantage over the glass reactor used in Examples 1–4. Refluxing liquid minimizes loss of acetic anhydride and also washes back any aromatic acids, bisphenol acetate, and low molecular weight oligomers which tend to sublime in the glass tube reactor. Polymer product can be taken to any desired I.V., limited only by the reboiler temperature and constraints of removal of the viscous mass, which may be by physical means or by dissolving it in more solvent (e.g., a chlorohydrocarbon) and then adding a compound such as acetone that is miscible with the solvent but is a poor solvent for the polymer, causing the polymer to precipitate.

A preferred method is to prepare a tractable prepolymer in the apparatus immediately described above and then post polymerize the prepolymer in a vented extruder or similar apparatus. The prepolymerization can be operated at atmospheric pressure, or at reduced pressure to facilitate acetic acid removal, or at superatmospheric pressure if a low boiling solvent such as a xylene is used.

For an example, this type of laboratory apparatus was used to receive five times the approximate reactor charge of Example 1.

Reactants charged to reboiler:
145 g BPA
79 g IPA
26.5 g TPA
133 g Ac 0 (99%, 1% HOAc)
134.5 g Diphenyl oxide
0.065 g Cobalt (II) acetate .4H$_2$O
0.035 g Lithium hydroxide .H$_2$O Heat was applied to the reboiler (1 atmos.) and acetic acid was distilled at 1:1 reflux ratio until its generation rate slowed and then the reflux ratio was increased. The reaction mixture became homogeneous at 250° C. Total run time to remove acetic acid formed at the maximum reboiler temperature (275° C.) was 92 min. The amount of acetic acid distilled corresponded to about 90% of the theoretical for the polycondensation reaction. Dowtherm A was not distilled off.

The molten reactor-reboiler product was clear and very pale blue in color. It solidified at 155° C. to a stable nonsticky, near-white solid which could be ground and stored. Via analytical measurements, the prepolymer had an estimated I.V. of 0.13 dl/g.

A sample of this prepolymer was post polymerized in the reactor of Example 1 at 310° C. for 120 min at 0.1 to 0.05 torr absolute pressure. The polymer had properties:
I.V. = 0.675
Hunter b = −0.2
Hunter L = 86.1
Hunter a = 0.4
Hunter YI = 0.0

This is a clear, transparent, near water white, tough material.

EXAMPLE 6

Further polyarylate samples were prepared by the process of Example 5, that is, prepolymer preparation followed by batch post polymerization. Results are shown in Table 4. The catalyst concentration shown is that in ultimate polymer and was calculated from the initial charge.

TABLE 4

| Sample No. | Catalyst Concentration | I.V. dl/g | Color b | L | YI |
|---|---|---|---|---|---|
| 1 | None | 0.32 | 7.3 | 93.9 | 11.2 |
| 2 | Co (40 ppm) | 0.40 | 5.5 | 90.2 | 9.8 |
| 3 | Co (40 ppm) + Li (25 ppm) | 0.57 | −0.9 | 90.6 | 1.5 |
| 4 | Li (25 ppm) | 0.60 | 7.6 | 93.5 | 12.3 |

As can be seen, Sample 3 provided the best color and illustrates the advantages of adding the cobalt as cocatalyst.

EXAMPLE 7

The relative activities of Co combined with 3.7 mmoles of Li, Na, K, or Cs were compared in runs conducted as in Example 5. The solvent was diphenyl oxide for all Examples. Results are shown in Table 5. The catalyst concentration shown is that in ultimate polymer and was calculated from the initial charge.

TABLE 5

| Sample No. | Catalyst Concentration | I.V. dl/g | Color b | L |
|---|---|---|---|---|
| 1 | Co (40 ppm) + K (145 ppm) | 0.466 | 2.3 | 88.7 |
| 2 | Co (40 ppm) + Cs (492 ppm) | 0.42 | 4.5 | 89.6 |
| 3 | Co (40 ppm) + Li (25 ppm) | 0.57 | −0.9 | 90.6 |
| 4 | Co (40 ppm) + Na (85 ppm) | 0.40 | 5.5 | 90.2 |
| 5 | None | 0.32 | 7.3 | 93.9 |

EXAMPLE 8

Further samples of the polyarylates were made by the two-step procedure as in Example 5. The amounts and presence of Li and Co were varied during the prepolymerization stage. During postpolymerization, an ultramarine blue pigment was added in certain runs for comparison. Results are shown in Table 6. The catalyst concentration shown is that in ultimate polymer and was calculated from the initial charge.

TABLE 6

| Sample No. | Catalyst Concentration | I.V. | L | a | b | YI |
|---|---|---|---|---|---|---|
| 1 | Co (25 ppm) + Li (25 ppm) + UMB (40 ppm) | 0.63 | 90.6 | −0.6 | 0.7 | 0.9 |
| 2 | Co (25 ppm) + Li (25 ppm) | 0.80 | 89.6 | −2.2 | 5.9 | 10.0 |
| 3 | Li (25 ppm) + UMB (40 ppm) | 0.53 | 92.8 | −1.9 | 4.7 | 7.6 |
| 4 | Li (25 ppm) | 0.60 | 93.5 | −3.0 | 7.6 | 12.3 |
| 5 | UMB (93 ppm) | 0.32 | 89.3 | −4.2 | 6.0 | 8.6 |

What is claimed is:

1. In a process for the production of polyarylates by reacting under esterification conditions a mixture of a diester of a dihydric phenol, at least one aromatic dicarboxylic acid and a non cobalt-containing polyesterification catalyst, the improvement which comprises: adding cobalt to the reaction mixture.

2. The improved process of claim 1 wherein said cobalt is added to the reaction mixture in an amount of at least 20 ppm relative to the polymer which is formed.

3. The improved process of claim 2 wherein said cobalt is added to the reaction mixture in an amount of from at least about 25 ppm based on polymer.

4. The improved process of claim 3 wherein said cobalt is added to the reaction mixture in an amount of from between about 30 to 60 ppm based on polymer.

5. The improved process of claim 1 wherein said dihydric phenol is bisphenol-A.

6. The improved process of claim 1 wherein said aromatic dicarboxylic acid is selected from the group consisting of isophthalic acid, terephthalic acid and mixtures thereof.

7. The process of claim 6 wherein said aromatic dicarboxylic acid comprises a mixture of isophthalic acid and terephthalic acid.

8. The improved process of claim 7 wherein the mole ratio of isophthalic acid to terephthalic acid is 3:1.

9. The improved process of claim 1 wherein said polyesterification catalyst comprises an alkali metal.

10. The improved process of claim 9 wherein said alkali metal comprises lithium.

11. The improved process of claim 1 wherein said reaction mixture further contains 10 to 60 wt. % of a solvent.

12. In a process for the production of polyarylates by reacting under esterification conditions, a mixture of a diacetate of a dihydric phenol, at least one aromatic dicarboxylic acid, and a non cobalt-containing polyesterification catalyst, the improvement which comprises: adding cobalt to the reaction mixture.

13. The improved process of claim 12 wherein said diacetate of the dihydric phenol is produced in-situ during said reacting by reaction of acetic anhydride and said dihydric phenol.

14. The improved process of claim 12 wherein said reaction mixture further contains 10 to 60 wt. % of a solvent.

15. The improved process of claim 12 wherein said cobalt is present in an amount of from between about 25 to 60 ppm based on polymer.

16. The improved process of claim 12 wherein said dihydric phenol is bisphenol-A.

17. The improved process of claim 12 wherein said aromatic dicarboxylic acid is selected from the group consisting of isophthalic acid, terephthalic acid and mixtures thereof.

18. The process of claim 17 wherein said aromatic dicarboxylic acid comprises a mixture of isophthalic acid and terephthalic acid.

19. The improved process of claim 18 wherein the mole ratio of isophthalic acid to terephthalic acid is 3:1.

20. The improved process of claim 12 wherein said polyesterification catalyst comprises an alkali metal.

21. The improved process of claim 20 wherein said alkali metal comprises lithium.

22. The improved process of claim 12 wherein said cobalt is added in the form of cobalt acetate and wherein said polyesterification catalyst is lithium acetate.

23. The improved process of claim 12 wherein said cobalt is added in the form of cobalt 2-ethylhexanoate and said catalyst is lithium hydroxide.

24. The improved process of claim 14 wherein said solvent comprises diphenyl oxide.

25. The improved process of claim 12 wherein said reacting is done in two stages, a first stage to form a prepolymer having an intrinsic viscosity of less than about .45 dl/g as measured in 1,1,2,2-tetrachloroethane at 30° C. and a post polymerization stage wherein said prepolymer is polymerized at temperatures of at least about 275° C. to form a polyarylate having an intrinsic viscosity of greater than 0.45 dl/g as measured in 1,1,2,2-tetrachloroethane at 30° C.

26. The improved process of claim 25 wherein said cobalt is added during the first stage wherein said prepolymer is formed.

27. The process of claim 26 wherein said cobalt is present in an amount to provide less than about 25 ppm cobalt in said polyarylate and an ultramarine blue pigment is added to the prepolymer during the post polymerization stage.

28. In a process for the production of polyarylate by reacting under esterification conditions, a mixture of a diester of a dihydric phenol, at least one aromatic dicarboxylic acid, and a non cobalt-containing polyesterification catalyst, the improvement which comprises: adding cobalt to the reaction mixture in an amount less than about 25 ppm based on polymer and an ultramarine blue pigment to reduce the yellow tint of the formed polyarylate.

29. The improved process of claim 28 wherein the ultramarine blue pigment is added in amounts of from about 20 to 100 ppm based on polymer.

30. The improved process of claim 29 wherein said reaction mixture further contains 10 to 60 wt. % of a solvent.

31. The improved process of claim 28 wherein said diester of a dihydric phenol is the diacetate of bisphenol-A.

32. The improved process of claim 31 wherein said aromatic dicarboxylic acid is selected from the group consisting of isophthalic acid, terephthalic acid and mixtures thereof.

33. The process of claim 32 wherein said aromatic dicarboxylic acid comprises a mixture of isophthalic acid and terephthalic acid.

34. The improved process of claim 33 wherein the mole ratio of isophthalic acid to terephthalic acid is 3:1.

35. The improved process of claim 28 wherein said polyesterification catalyst comprises an alkali metal.

36. The improved process of claim 1 wherein said reacting is done in a plurality of stages wherein the intrinsic viscosity of the polymer formed is increased as the polymer progresses through said stages, the reaction and transfer of the polymer between stages being done on a continuous basis.

37. The improved process of claim 12 wherein said reacting is done in a plurality of stages wherein the intrinsic viscosity of the polymer formed is increased as the polymer progresses through said stages, the reaction and transfer of the polymer between stages being done on a continuous basis.

38. The improved process of claim 1 wherein said cobalt is added to the reaction mixture in the form a cobalt salt.

39. The improved process of claim 12 wherein said cobalt is added to the reaction mixture in the form a cobalt salt.

40. The improved process of claim 28 wherein said cobalt is added to the reaction mixture in the form a cobalt salt.

* * * * *